US006766037B1

(12) United States Patent
Le et al.

(10) Patent No.: US 6,766,037 B1
(45) Date of Patent: Jul. 20, 2004

(54) SEGMENTING MOVING OBJECTS AND DETERMINING THEIR MOTION

(75) Inventors: Delphine Anh Dao Le, Drummoyne (AU); Mathieu Hitter, Paris (FR); Alison Joan Lennon, Balmain (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/410,735

(22) Filed: Oct. 1, 1999

(30) Foreign Application Priority Data

| Oct. 2, 1998 | (AU) | PP6341 |
| Oct. 2, 1998 | (AU) | PP6342 |
| Oct. 2, 1998 | (AU) | PP6343 |
| Oct. 2, 1998 | (AU) | PP6344 |
| Aug. 11, 1999 | (AU) | PQ2142 |

(51) Int. Cl.[7] .................................................. G06K 9/00
(52) U.S. Cl. .................... 382/107; 73/488; 382/164; 382/171
(58) Field of Search ................. 382/103, 107, 382/164, 171, 173, 177, 179, 199, 256, 268; 348/169, 170, 171, 172, 54, 55; 73/488

(56) References Cited

U.S. PATENT DOCUMENTS

| 5,692,063 A | * | 11/1997 | Lee et al. | 382/107 |
| 5,748,761 A | * | 5/1998 | Chang et al. | 382/107 |
| 6,400,831 B2 | * | 6/2002 | Lee et al. | 382/103 |
| 6,487,304 B1 | * | 11/2002 | Szelisiki | 382/107 |

OTHER PUBLICATIONS

"Multiscale Minimization Of Global Energy Functions In Some Visual Recovery Problems", by F. Heitz, et al., CVGIP: Image Understanding, vol. 59, No. 1, pp. 125,134, Jan. 1994.

* cited by examiner

Primary Examiner—Jayanti K. Patel
Assistant Examiner—Abolfazl Tabatabai
(74) Attorney, Agent, or Firm—Fitzpatrick, Cella, Harper & Scinto

(57) ABSTRACT

The method discloses a method of segmenting moving objects and determining their motion from video data. The method generates (104) a motion vector field by comparing the current frame of video data with the previous frame, where a motion vector is determined for each pixel of the current frame. The method then generates (106) a motion parameter field by sliding a window over the motion vector field of the current frame, and determining a set of motion parameters for each pixel based on a motion model of the motion vector field. The method then distributes (108) seeds throughout the motion parameter field so that fewer seeds are allocated to those areas of the motion parameter field having homogeneous motion parameter sets. The method then grows (110) regions from said seeds so as to segment the motion parameter field into a number of regions. The method considers a number of pixels that border the growing regions and the pixel that has a motion vector that is most similar to the motion parameter field of a region it borders is appended to that region. The method then updates the set of motion parameters of the appended region. The method continues until there are no more pixels bordering the growing regions.

27 Claims, 8 Drawing Sheets

SEGMENTING MOVING OBJECTS AND DETERMINING THEIR MOTION

FIELD OF INVENTION

The present invention relates to the field of image motion. In particular, the invention relates to a method and apparatus for segmenting moving objects and determining their motion from video image data The invention also relates to a computer program product including a computer readable medium having recorded thereon a computer program for segmenting moving objects and determining their motion from video image data.

BACKGROUND OF INVENTION

Image motion plays an important role in computer vision and scene understanding. Image motion analysis has been applied to many fields over the last few decades, including object tracking, autonomous navigation, surveillance and virtual reality. More recently, motion information has played an important role in video indexing, contributing to video segmentation and shot classification.

The U.S. Pat. No. 5,748,761 by Chang et al discloses a method of segmenting a moving object and estimating its motion from video image data. Chang et al intially compares a current frame with a previous frame of video image data and generates a motion vector field. Chang et al then segments the motion vector field into moving objects and describes each motion of the moving objects with a set of motion parameters. This segmentation is achieved by utilising a region seeding and region growing procedure. The region seeding procedure consists of sliding a window block on the motion vector field, and computing the degree of homogeneity for each of the window blocks and selecting the most homogeneous window block as a seed block. The region growing procedure is then iteratively repeated until the difference between the current revised region and the previous revised region is less than a predetermined threshold value. Presumably, the threshold value is arbitrarily selected by a user. However, this method suffers from the disadvantage that the choice of threshold values is critical for successful segmentation of the moving objects. Specifically, a particular threshold value may work with one video image but not necessarily with others. For example, this method often fails to split regions that must be separated or fails to merge regions that need not be separated.

SUMMARY OF THE INVENTION

It is an object of the present invention to ameliorate one or more disadvantages of the background art.

According to one aspect of the invention there is provided a method of segmenting moving objects and determining their motion from video image data, wherein said method comprises the steps of: distributing seeds in areas of a current frame of video data as a function of motion of pixels of the current frame as compared to a previous frame, wherein fewer seeds are allocated to those areas of the current frame having homogeneous motion; and growing regions from said- seeds so as to segment the current frame into a number of said objects, wherein a number of pixels that border said growing regions are considered and that pixel of said number having a motion that is most similar to a motion of a region it borders is appended to that region and the motion of the appended region is updated and said growing step is repeated until no pixels bordering the growing regions are available.

According to another aspect of the invention there is provided a method of segmenting moving objects and determining their motion from video image data, wherein said method comprises the steps of: comparing a current frame with a preceding frame of the video image data to compute a motion parameter field having a plurality of sets of motion parameters, wherein each pixel of the current frame has a corresponding said set of motion parameters, distributing seeds in areas of the motion parameter field as a function of the motion parameter sets within those areas, wherein fewer seeds are allocated to those areas of the motion parameter field having homogeneous motion parameter sets; and growing regions from said seeds so as to segment the current frame into a number of said objects, wherein a number of pixels that border said growing regions are considered and that pixel of said number having a motion value that is most similar to a set of motion parameters of a region it borders is appended to that region and the set of motion parameters of the appended region is updated and said growing step is repeated until no pixels bordering the growing regions are available.

According to still another aspect of the invention there is provided a method of segmenting moving objects and determining their motion from video image data, wherein said method comprises the steps of: (a) comparing a current frame with a preceding frame of the video image data to compute a motion vector field having a plurality of motion vectors, wherein each pixel of the current frame bas a corresponding motion vector; (b) sliding window blocks over the motion vector field and generating a motion parameter field, wherein each pixel of the current frame has a corresponding set of motion parameters and the sets of motion parameters are based on a motion model of said motion vectors; (c) allocating pixels as seeds in areas of the current image as a function of the corresponding motion parameter sets within those areas, wherein fewer seeds are allocated to those areas of the current image having homogeneous motion parameter sets and wherein said seeds form growing regions; (d) generating a list of pixels and corresponding motion vectors that border the growing regions; (e) scanning a number of said pixels of the list; (f) determining, for each said scanned pixel, a value indicative of the similarity of the corresponding motion vector of said scanned pixel and the corresponding set of motion parameters of a growing region that said scanned pixel borders; (g) selecting a pixel that has a minimum said value; (h) appending said selected pixel to said growing region it borders; (i) updating the set of motion parameters of the appended region; (j) repeating the sub-steps (d) to (i) until there are no more pixels that border the growing regions; and (k) merging neighbouring grown regions to produce a merged region if their similarity is less than a predetermined threshold, wherein said merged regions represent said moving objects and their corresponding sets of motion parameters represent their motion.

According to still another aspect of the invention there is provided apparatus for segmenting moving objects and determining their motion from video image data, wherein said apparatus comprises: means for distributing seeds in areas of a current frame of video data as a function of motion of pixels of the current frame as compared to a previous frame, wherein fewer seeds are allocated to those areas of the current frame having homogeneous motion; and means for growing regions from said seeds so as to segment the current frame into a number of said objects, wherein a number of pixels that border said growing regions are considered and that pixel of said number having a motion that is most similar to a motion of a region it borders is appended to that region and the motion of the appended region is updated and said growing step is repeated until no pixels bordering the growing regions are available.

According to still another aspect of the invention there is provided apparatus for segmenting moving objects and determining their motion from video image data, wherein said apparatus comprises: means for comparing a current frame with a preceding frame of the video image data to compute a motion parameter field having a plurality of sets of motion parameters, wherein each pixel of the current frame has a corresponding said set of motion parameters; means for distributing seeds in areas of the motion parameter field as a function of the motion parameter sets within those areas, wherein fewer seeds are allocated to those areas of the motion parameter field having homogeneous motion parameter sets; and means for growing regions from said seeds so as to segment the current frame into a number of said objects, wherein a number of pixels that border said growing regions are considered and that pixel of said number having a motion value that is most similar to a set of motion parameters of a region it borders is appended to that region and the set of motion parameters of the appended region is updated and said growing step is repeated until no pixels bordering the growing regions are available.

According to still another aspect of the invention there is provided apparatus for segmenting moving objects and determining their motion from video image data, wherein said apparatus comprises: means for comparing a current frame with a preceding frame of the video image data to compute a motion vector field having a plurality of motion vectors, wherein each pixel of the current frame has a corresponding motion vector; mean for sliding window blocks over the motion vector field and generating a motion parameter is field, wherein each pixel of the current frame has a corresponding set of motion parameters and the sets of motion parameters are based on a motion model of said motion vectors; means for allocating pixels as seeds in areas of the current image as a function of the corresponding motion parameter sets within those areas, wherein fewer seeds are allocated to those areas of the current image having homogeneous motion parameter sets and wherein said seeds form growing regions; means for generating a list of pixels and corresponding motion vectors that border the growing regions; means for scanning a number of said pixels of the list; means for determining, for each said scanned pixel, a value indicative of the similarity of the corresponding motion vector of said scanned pixel and the corresponding set of motion parameters of a growing region that said scanned pixel borders; means for selecting a pixel that has a minimum said value; means for appending said selected pixel to said growing region it borders; means for updating the set of motion parameters of the appended region; means for repeating the operations of the generating means, scanning means, determining means, selecting means, appending means, and updating means until there are no more pixels that border the growing regions; and means for merging neighbouring grown regions to produce a merged region if their similarity is less than a predetermined threshold, wherein said merged regions represent said moving objects and their corresponding sets of motion parameters represent their motion.

According to still another aspect of the invention there is provided a computer program product including a computer readable medium having recorded thereon a computer program for segmenting moving objects and determining their motion from video image data, wherein said computer program product comprises: means for s distributing seeds in areas of a current frame of video data as a function of motion of pixels of the current frame as compared to a previous frame, wherein fewer seeds are allocated to those areas of the current frame having homogeneous motion; and means for growing regions from said seeds so as to segment the current frame into a number of said objects, wherein a number of pixels that border said growing regions are considered and that pixel of said number having a motion that is most similar to a motion of a region it borders is appended to that region and the motion of the appended region is updated and said growing step is repeated until no pixels bordering the growing regions are available.

According to still another aspect of the invention there is provided a computer program product including a computer readable medium having recorded thereon a computer program for segmenting moving objects and determining their motion from video image data, wherein said computer program product comprises: means for comparing a current frame with a preceding frame of the video image data to compute a motion parameter field having a plurality of sets of motion parameters, wherein each pixel of the current frame has a corresponding said set of motion parameters; means for distributing seeds in areas of the motion parameter field as a function of the motion parameter sets within those areas, wherein fewer seeds are allocated to those areas of the motion parameter field having homogeneous motion parameter sets; and means for growing regions from said seeds so as to segment the current frame into a number of said objects, wherein a number of pixels that border said growing regions are considered and that pixel of said number having a motion value that is most similar to a set of motion parameters of a region it borders is appended to that region and the set of motion parameters of the appended region is updated and said growing step is repeated until no pixels bordering the growing regions are available.

According to still another aspect of the invention there is provided a computer program product including a computer readable medium having recorded thereon a computer program for segmenting moving objects and determining their motion from video image data, wherein said computer program product comprises: means for comparing a current frame with a preceding frame of the video image data to compute a motion vector field having a plurality of motion vectors, wherein each pixel of the current frame has a corresponding motion vector; mean for sliding window blocks over the motion vector field and generating a motion parameter field, wherein each pixel of the current frame has a corresponding set of motion parameters and the sets of motion parameters are based on a motion model of said motion vectors; means for allocating pixels as seeds in areas of the current image as a function of the corresponding motion parameter sets within those areas, wherein fewer seeds are allocated to those areas of the current image having homogeneous motion parameter sets and wherein said seeds form growing regions; means for generating a list of pixels and corresponding motion vectors that border the growing regions; means for scanning a number of said pixels of the list; means for determining, for each said scanned pixel, a value indicative of the similarity of the corresponding motion vector of said scanned pixel and the corresponding set of motion parameters of a growing region that said scanned pixel borders; means for selecting a pixel that has a minimum said value; means for appending said selected pixel to said growing region it borders; means for updating the set of motion parameters of the appended region; means for repeating the operations of the generating means, scanning means, determining means, selecting means, appending means, and updating means until there are no more pixels that border the growing regions; and means for merging neighbouring grown regions to produce a merged region if their similarity is less than a predetermined threshold, wherein said merged regions represent said moving objects and their corresponding sets of motion parameters represent their motion.

BRIEF DESCRIPTION OF THE DRAWINGS

Embodiments of the invention are described with reference to the drawings, in which.

DETAILED DESCRIPTION

Figure 1:
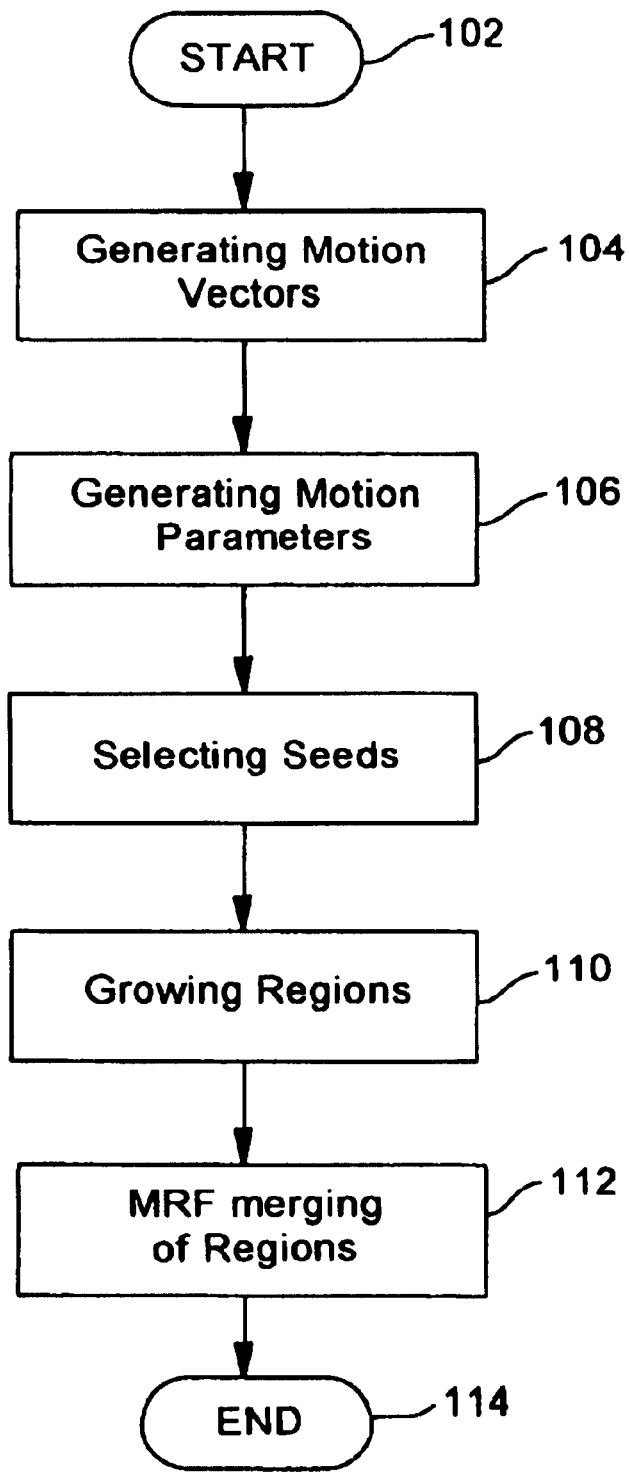
FIG. 1 is a flow chart of a method of segmenting moving objects and determining their motion from video image data in accordance with a preferred embodiment.

Where reference is made in any one or more of the accompanying drawings to steps and/or features, which have the same reference numerals, those steps and/or features have for the purposes of this description the same function (s) and/or operation(s), unless the contrary intention appears.

The principles of the preferred method have general applicability to the segmentation of multiple colored or black and white video images. The method has been described with reference to a number of specific examples of images and it is not intended that the invention be limited to such specific examples.

1.0 Overview of Preferred Method

FIG. 1 is a flow diagram of a method of segmenting moving objects and determining their motion from video image data in accordance with a preferred embodiment. Preferably, the video image data consists of a plurality of frames each including a pixel-map representation of an original image. The pixel-map can include a numerical representation of the particular color for each pixel location in a rectangular array. Any numerical representation of color can be used and can be expressed as a sequence of one or more numbers. Pixel locations at the pixel grid are represented by an array of row (i) and column (j) specifications.

The preferred method commences at step 102, where a current frame and a preceding frame of video image data are input. Where the video image data comprises more than two frames of image data, the method is called and started for each subsequent frame of video image data.

The second step 104 of the preferred method compares the current frame of video image data with the preceding frame to produce a motion vector field. In particular, it generates a motion vector for each pixel location. Any gradient-based or block-based motion estimation method can be used. A suitable robust multiscale approach to determining a motion vector field based on Markov random field modelling is disclosed in Heitz et al. (F. Heitz, P. Perez and P. Bouthemy, "Multiscale minimiztion of global energy functions in some visual recovery problems", CVGIP: Image Understanding, vol. 59, no. 1, pp. 125–134, January. 1994.).

Preferably, the method comprises a third step 106 for computing a motion parameter field. The third step 106 of the preferred method consists of sliding a window, preferably a square n×n block, over the motion vector field generated by step 104, and estimating the parameter values of a linear motion model which best describe the motion field in this window. The number of parameters in the model depends on the required complexity. The affine model composed of 6 parameters is preferably used. Let (x,y) represent the position of a pixel p in the 2-D image plane, and let u(x,y) and v(x,y) be respectively the horizontal and vertical component of the vector describing the motion of pixel p(x,y). The affine model equations can be formulated as follows:

$$\begin{cases} u(x, y) = a_0 + a_1 x + a_2 y \\ v(x, y) = a_3 + a_4 x + a_5 y \end{cases} \quad \text{Eqn (1)}$$

Preferably, a 3×3 sliding window is used. The sliding window is centred on each motion vector in the motion field in order to determine the parameters (e.g. an, $a_0$, $a_1$, $a_2$, $a_3$, $a_4$, $a_5$) for that centred motion vector. Once the sliding window is centred, the affine model equations for each motion vector in the sliding window are formulated. The method then determines the parameters (e.g. $a_0$, $a_1$, $a_2$, $a_3$, $a_4$, $a_5$) for the centre motion vector of the window. It does this by using robust regression methods such as M-estimators on the affine model equations formulated for that window. Alternatively, a least-squares method may be used. This step 106 results in a motion parameter field, where each pixel of the current frame has an associated set of motion parameters (e.g. $a_0$ $a_1$, $a_2$, $a_3$, $a_4$, $a_5$). The motion parameter field can be represented in a similar way as the pixel-map of the frames, namely in a rectangular array. The rectangular array comprising pixel locations represented by an array of row (i) and column (j) specifications, with the sets of motion parameters stored in respective pixel locations of the array.

The fourth step 108 consists in initialising the segmentation process by automatically finding seeds for regions of the motion parameter field. In step 108, a list of pixel locations is generated which are to be used as seeds for region growing. The automatic selection of an appropriate set of pixel locations or set of small connected regions, called seeds controls the method of initially segmenting the motion parameter field. The selection of the set of seeds or small regions is critical for the success of the segmentation. This can be done by using a quad-tree approach in order to distribute seeds according to a homogeneity criterion on the motion parameters. Another criterion which can be considered is the residual error between the actual motion field and the motion field which can be predicted from the motion model parameters: seeds should be placed in areas where the residual error is homogeneously low. The preferred process for generating these seeds is described in more detail in the next section, herein entitled "1.1 *Process for Selecting Seeds*".

In the fifth step 110, the process takes the generated seeds and grows seeded regions in an iterative fashion. At each iteration, all those sets of motion parameters associated with pixels of the motion parameter field that border all the growing regions are considered. That pixel which has an associated set of motion parameters that is most similar to the motion parameters of a region that it borders is appended to that region. Alternatively, the similarity of a limited number of these pixels and their associated sets of motion parameters are only considered at each iteration, thus speeding up the processing. The preferred process for growing the seeded regions is described in more detail in the section herein entitled "1.2 *Process for Growing Seeded Regions*". This process continues until all pixels have been allocated to an associated region, resulting in a segmented motion parameter field. The output of the seeded region growing is a set of homogeneous regions, wherein the number of regions obtained is equal to the number of seeds. During this step, the regions will continue to grow until they are bounded on all sides by other growing/grown regions. Also, some regions will grow more at the expense of others. For instance, there will tend to be large regions in the homogeneous areas and small regions in the non-homogeneous areas. Furthermore, the motion parameters for each region are re-evaluated while the region grows. In this way, the preferred method is able to segment videos into objects and describe the motion of each object with a set of motion parameters.

Preferably, the method comprises a sixth step 112 for merging regions. In the sixth step 112 of the preferred method adjacent regions which present similarities can be merged. The similarity measure can be based on global motion parameters. A Markov random field defined on a region-adjacency graph can be used to merge the regions, allowing the combination of multiple sources of information. This step 112 merges similar segmented regions in a systematic approach, wherein the number of segmented regions are reduced by taking into account region uniformity of motion parameters. Discontinuities can also be taken into account by introducing a boundary process, Regions, which should not have been separated during the earlier segmentation steps 108 and 110, can be merged during this merging step 112. On the other hand, regions which should have been separated during the earlier segmentation steps 108 and 110, cannot be separated during this merging step. Thus during steps 108 and 110, over-segmentation may be preferred. The output of this merging process is a final segmented image. The preferred MRF merging process is described in more detail in the section herein entitled "1.3 *Markov Random Field (MRF) Merging Process*". In some circumstances, this step 112 may be omitted.

After completion of the sixth step 112, the processing terminates 114.

1.1. Process for Selecting Seeds

The seed selection process 108 is a simple and fast quad-tree approach, which distributes the seeds over the motion parameter field, but it allocates fewer seeds in homogeneous areas of the notion parameter field. The seed selection process address motion data by preferably processing the motion parameter sets. The homogeneity for a particular area is measured by a contrast criterion dependent on the difference between the maximum and minimum motion in that area. This contrast criterion can be determined in accordance with the following formulae:

$$\text{contrast} = \sum_{0}^{t=5} w_t (\min(a_t) - \max(a_t))^2 \text{ where } w_t = \frac{1}{\sigma_t^2}$$

and $\sigma_t^2$ is the variance of the motion parameters $a_t$ within the designated area Eqn(2)

The following pseudocode is illustrative of the method of seeding a motion parameter field image for use in FIG. 1.

Pseudocode SEED

RECTANGLE A rectangle, given by (x,y) and (width, height)

RECTANGLE_LIST FIFO list of rectangles

SEED_LIST List of pixel locations (seeds)

CONTRAST see Eqn (2) above,

HI_MIN_SIZE Maximum block size for contrast assessment

LO_MIN_SIZE Minimum block size for block splitting (<HI_MI_SIZE)

HI_DENSITY, LO_DENSITY Densities for seed spreading

HI_THRESHOLD, LO_THRESHOLD Contrast thresholds

Initialize RECTANGLE_LIST with the rectangle corresponding to the whole motion parameter field.

while RECTANGLE_LIST is not empty remove first element from RECTANGLE_LIST and keep it in RECTANGLE; assess CONTRAST for area of the motion parameter field corresponding to RECTANGLE;

if CONTRAST <LO_THRESHOLD add the pixel location corresponding to the center of RECTANGLE to SEED_LIST;

continue loop;

if RECTANGLE size >HI_MIN_SIZE split RECTANGLE into four and add the new rectangles in RECTANGLE_LIST;

continue loop;

if CONTRAST <HI_THRESHOLD spread seeds over RECTANGLE with LO_DENSITY; add them to SEED_LIST;

continue loop;

if RECTANGLE size >LO_MIN_SIZE split RECTANGLE into four and add the new rectangles in RECTANGLE_LIST;

continue loop;

spread seeds over RECTANGLE with HI_DENSITY;

add them to SEED_LIST;

endwhile

Figure 2:
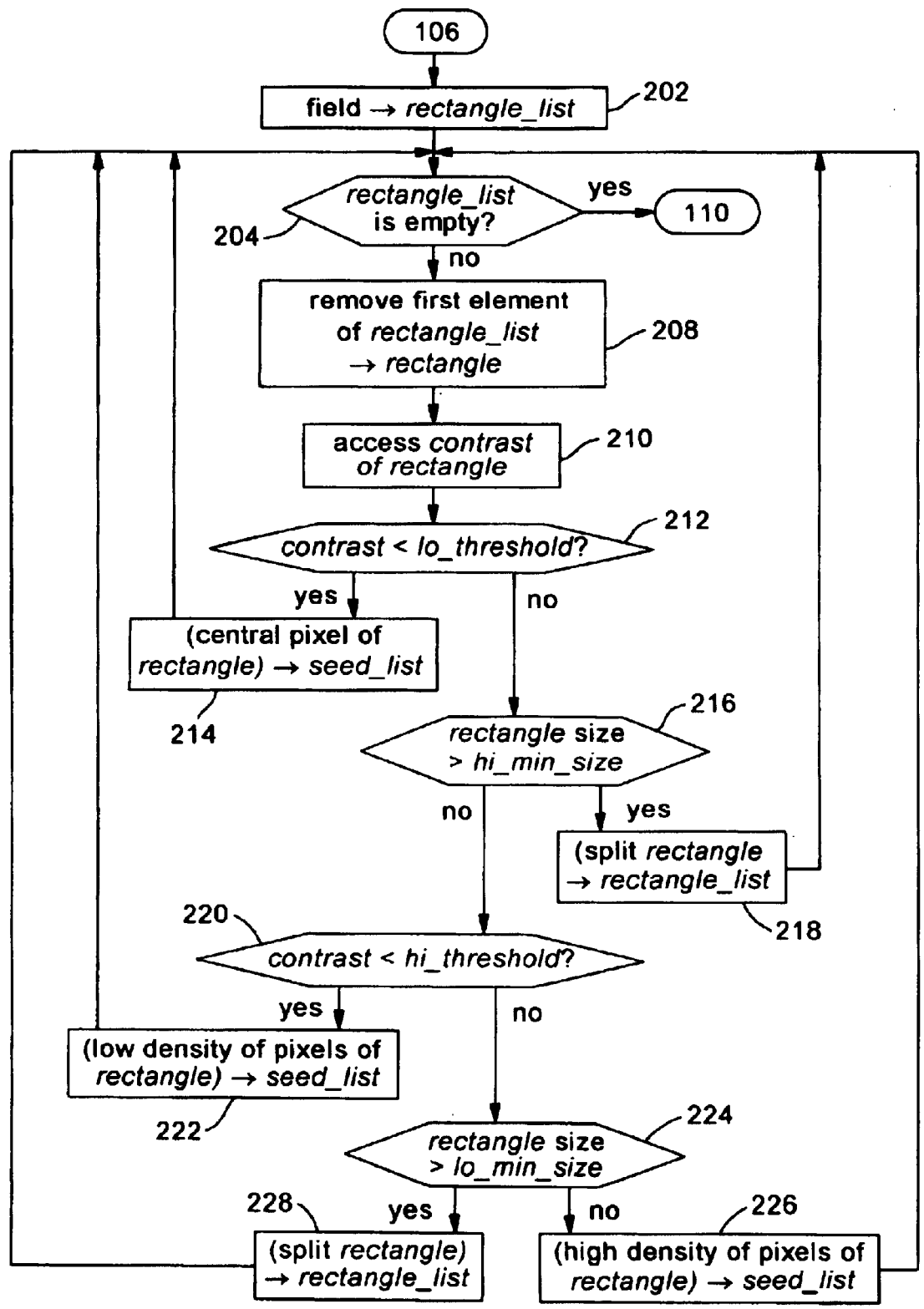
FIG. 2 is a flow chart of a method of seeding a motion parameter field for use in the method of FIG. 1.

Turning now to FIG. 2, there is shown a flow chart of the last mentioned pseudocode called SEED. The seed selection processing commences at step 202 after completion of the generation of the motion parameter field in step 106. In step 202, the rectangle co-ordinates corresponding to the entire motion parameter field are stored in a FIFO buffer called RECTANGLE_LIST. After step 202, the processing continues at decision block 204, where a check is made whether the RECTANGLE_LIST is empty. If the decision block returns true then processing proceeds to step 110. Otherwise, the processing continues at step 208, where the first element in RECTANGLE_LIST is removed and stored in the variable rectangle.

In the next step 210, the contrast of the entire motion parameter field or a sub-block thereof corresponding to the removed rectangle is determined. The contrast is determined in accordance with Eqn(2) with respect to the removed rectangle. After step 210, the processing continues at decision block 212, where a check is made whether the determined contrast is less than a predetermined low threshold value called LO_THRESHOLD. If the decision block 212 returns true, then the co-ordinates of central pixel location of the rectangle are added to a list called seed_list. In this way, sub-blocks of the motion parameter field corresponding to the rectangle which have a low contrast and which are of any size have a center as a seed (see Table A). If the decision block 212 returns false, the processing continues at decision block 216. In decision block 216, a check is made whether the size of the rectangle is greater than a predetermined constant called HI_MIN_SIZE. If the decision block 216 returns true, then the processing continues at step 218. In step 218, the rectangle is divided into four sub-rectangles in the manner of a quadtree approach. In this way, large sized sub-blocks of the motion parameter field having medium and high contrast are split (see Table A). After step 218, the processing continues at step 204, where the four sub-rectangles are added to the FIFO buffer RECTANGLE_LIST. If however, the decision block 216 returns false, the processing continues at decision block 220.

In the decision block 220, a check is made whether the determined contrast is less than a predetermined high threshold value called HI_THRESHOLD. If the decision block 220 returns true, then processing continues at step 222, where a number of pixel locations from the rectangle are added to the SEED_LIST as seeds. These newly added seeds are evenly distributed throughout the current rectangle in such a manner that there is a low density of such seeds in the rectangle. In this way, a low density seeding is achieved for small and medium sub-blocks having a medium contrast (See Table A). After step 222, the processing continues at step 204. If, however, the decision block 220 returns false then the processing continues at decision block 224.

In the decision block 224, a check is made whether the size of the rectangle is greater than a predetermined minimum size called LO_MIN_SIZE. If the decision block returns false, the processing continues at step 226, where a number of pixel locations from the rectangle are added to the SEED_LIST as seeds. These newly added seeds are evenly distributed throughout the current rectangle in such a manner that there is a high density of such seeds in the rectangle. In this way, a high density seeding is achieved for small sized sub-blocks of the motion parameter field having a high contrast(See Table A). If, however, the decision block 224 returns true then the processing continues at step 428. In step 228, the rectangle is divided into four sub-rectangles in the manner of a quadtree approach. In this way, corresponding medium sized sub-blocks of the motion parameter field having a high contrast are split (see Table A).

TABLE A

Allocation of seeds as a function of:
(1) the contrast of current sub-block of the motion parameter field, and
(2) the size of the rectangle corresponding to the current sub-block as compared to the size of the rectangle corresponding to the entire motion parameter field

| | Small size | Medium size | Large size |
|---|---|---|---|
| Low contrast | Center of rectangle is a seed | Center of rectangle is a seed | Center of rectangle is a seed |
| Med contrast | Low density seeding | Low density seeding | Split rectangle |
| High contrast | High density seeding | Split rectangle | Split rectangle |

Turning now to Table A, it can be seen that the split rectangular regions of the motion parameter field of any size whose motion parameter sets have small variance in motion (low contrast) are seeded in their center. In addition, split rectangular regions of a small or medium size whose motion parameter sets have a medium variance in motion (medium contrast) are seeded evenly throughout these regions in a low density manner. Furthermore, rectangular regions of a small size whose motion parameter sets have a high variance in motion (high contrast) are seeded evenly throughout the region in a high density manner. On the other hand, rectangular regions of medium size and high contrast are split into four rectangular sub-regions. In addition, rectangular regions of a large size and of a medium or high contrast are also split into rectangular sub-regions. This splitting continues in a quadtree manner until the split sub-region(s) meets the abovementioned relevant size and contrast requirements for seeding.

Figure 3:
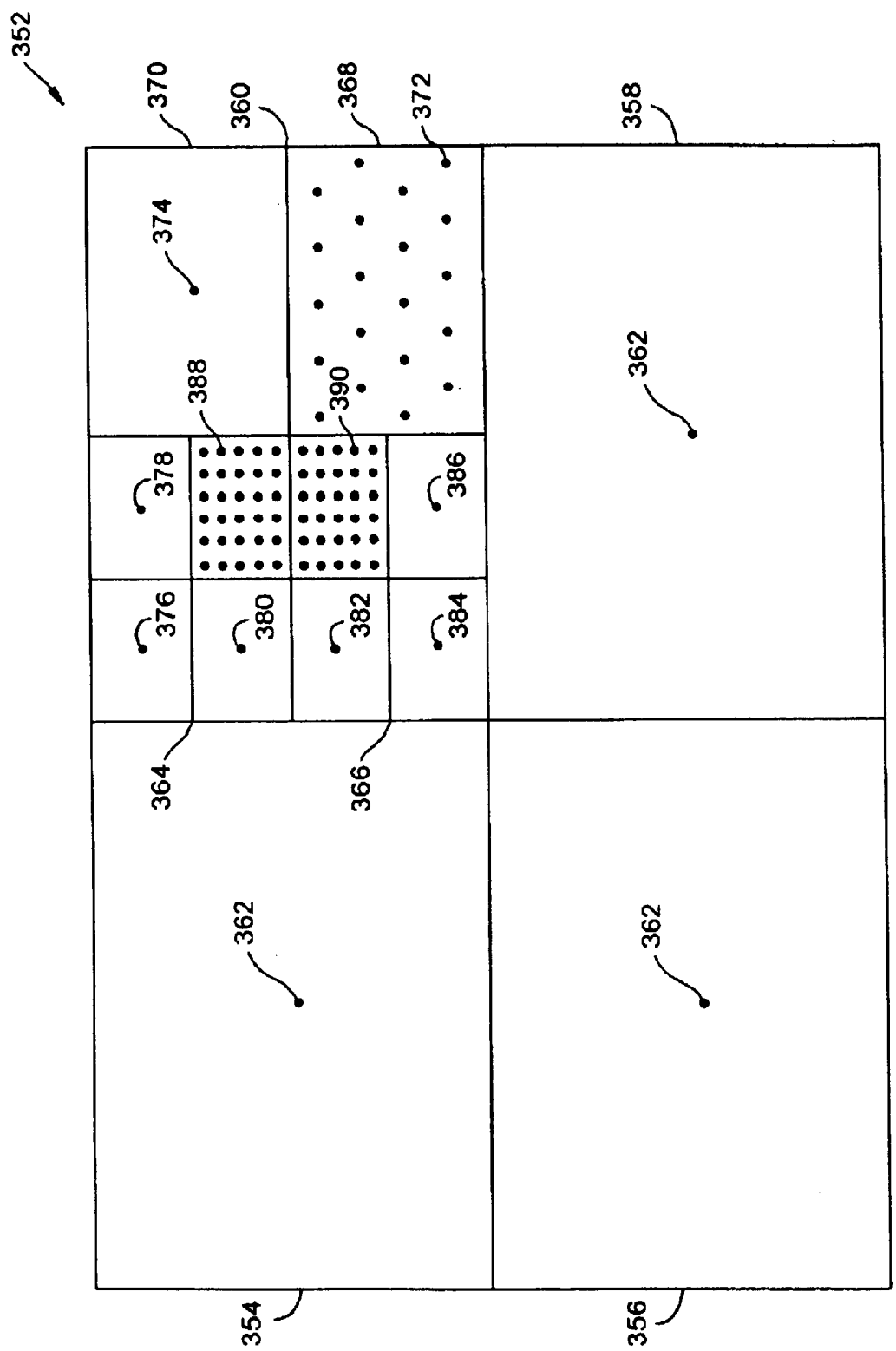
FIG. 3, illustrates an example of a motion parameter field seeded according to method of FIG. 2.

Turning now to FIG. 3, there is a shown an example of a current frame of video image data and its associated motion parameter field 352 seeded in accordance with the preferred process 108. As previously mentioned, each pixel of the current frame has an associated set of motion parameters. For simplicity's sake, only the seeded pixel locations of the current frame are shown. The remaining pixels are not shown. Initially, during the seeding process, the contrast of the entire motion parameter field of the current frame 352 of video image data is determined. The contrast being the difference between the maximum motion and minimum motion (See Eqn(2)). As the entire motion parameter field in this example has a medium contrast and is of a large size (as compared to itself), the motion parameter field is split into four rectangles 354,356,358, and 360. The process then considers each of the these rectangles 354,356,358, and 360. As the motion parameter fields, in this example, within rectangles 354,356, and 358 are of low contrast, and the rectangles are of a large size as compared to the original image, the centers of these rectangles are taken as seeds 362. However, as the motion parameter field, in to rectangle 360 is of a high contrast and the rectangle of large size, the rectangle is split further into four sub-rectangles 364,366, 368, and 370. The process then considers each sub-rectangle 364,366,368, and 370. As rectangle 364 and 366 are both of a high contrast and medium size they are each further split into four sub-rectangles. As rectangle 368 is of a medium contrast and size, the rectangle is allocated seeds 372 in a low density manner. In addition, as rectangle 370 is of a low contrast and medium size, the center of this rectangle is taken as a seed 374. The seeding processing continues in a similar manner, until all split rectangles have been seeded. In this particular example, the split rectangles are center seeded 376,378,380,382,384, and 386 and the remaining split rectangles are allocated seeds 388, and 390 in a high density manner. At the completion of the seeding process, a list of all the pixel locations of seeds 362,372,374,376,378,380,382,384,386, 388, and 390 is established.

The preferred seeding process is a simple and fast approach which distributes the seeds over the entire motion parameter field, while allocating fewer seeds in homogeneous areas of the motion parameter field. Furthermore, there is a high probability at least one seed will be allocated to each homogeneous region of the motion parameter field.

In an alternative embodiment, the seed selection process 108 takes as input the motion parameter field and initially generates a motion map for each motion parameter.

Specifically, the motion parameter field having sets of motion parameters (e.g. $a_0, a_1, a_2, a_3, a_4, a_5$), are separated into a plurality of motion maps (e.g 6). Namely, motion map i comprises a parameter of type $a_i$, for each pixel location of the current frame. The method then applies the seed selection process to each motion map individually. However, in this embodiment, the contrast criterion is the difference between the maximum and minimum motion parameter within the designated area of the motion map. Afterwards, the seeded motion maps are then added together to produce a seeded motion parameter field.

1.2 Process for Growing Seeded Regions

The seeded region growing process 110 takes a set of seeds, individual pixel locations or small groups of connected pixel locations, generated by step 108, as input. The preferred process 110 grows the seed regions in an iterative fashion. At each iteration, all those sets of motion parameters associated with pixel locations that border the growing regions are considered. That pixel out of all the pixels that border the growing regions, which has a set of motion parameters which is most similar to the set of motion parameters of the growing region that it borders, is appended to that region. In the preferred process, all the regions can be grown simultaneously.

The process evolves inductively from the seeds, namely, the initial state of the sets or regions $A_1, A_2, \ldots, A_n$. Each step of the iterative process involves the addition of one pixel location and its associated set of motion parameters to one of the above regions or sets. We now consider the state of the sets ($A_1$) after m steps. Let T be the set of all as-yet unallocated pixels which border at least one of the regions.

$$T = \left\{ p \notin \bigcup_{t=1}^{n} A_t \; \middle| \; N(p) \cap \bigcup_{t=1}^{n} A_t \neq 0 \right\}, \quad \text{Eqn (3)}$$

where N(p) is the set of immediate neighbors of the pixel p. For each candidate pixel p, an index i(p) is found, which correspond to the adjacent region where p is most likely to be included and a criterion $\delta(p)$ is computed; $\delta(p)$ measures how good a candidate p is for region $A_i$.

If, for $p \in T$ we have that N(p) meets just one of the $A_i$, then we define $i(p) \in \{1, 2, \ldots, n\}$ to be that index such that $N(p) \cap A_{i(p)} \neq 0$ and define $\delta(p)$ to be a measure of how different p is from the region it adjoins. The simplest definition for $\delta(p)$ is $$\delta(p) = [u(x_p, y_p) - (a_0 + a_1 x_p + a_2 y_p)]^2 + [(v(x_p, y_p) - (a_3 + a_4 x_p + a_5 y_p)]^2 \quad \text{Eqn(4)}$$

where $u(x_p, y_p)$ and $v(x_p, y_p)$ are the horizontal and vertical components of the motion vector respectively of the candidate pixel p at location $(x_p, y_p)$ and (e.g. $a_0, a_1, a_2, a_3, a_4, a_5$ are the motion parameters of region $A_i$. The motion parameters of region $A_i$ preferably are determinined by formulating said affine model equations (e.g. Eqn. (1)) for each pixel of region $A_1$ and then using robust regression methods such as M-estimators for determining the corresponding set of parameters for region $A_i$. Alternatively, the criterion $\delta(p)$ may be based on the difference between the motion parameter set of the candidate pixel and the region $A_i$.

If N(p) meets two or more of the $A_i$, we take i(p) to be a value of i such that N(p) meets $A_1$, and $\delta(p)$ is minimized.

Then, a candidate pixel $z \in T$ is chosen such that $$\delta(z) = \min_{x \in T} \{\delta(p)\}. \quad \text{Eqn (5)}$$

and append z to $A_{i(z)}$.

This completes step m+1. The process is repeated until all pixels have been allocated. The process commences with each $A_1$ being just one of the seeds. The equations 2 and 3 ensure that the final segmentation is into regions as homogeneous as possible given the connectivity constraint.

In the preferred process 110, $\delta(p)$ is updated only for a limited number of the candidate pixels at each step of the iteration. Consequently, as the motion vectors of the limited number of candidate pixels is always compared with the updated set of motion parameters of the neighboring regions, the quality of the segmentation is reasonable. Furthermore, as the process does not consider all the candidate pixels, especially when the list is relatively long, the speed of the region growing process can be significantly increased without reducing the quality of the final segmentation. The region growing process 110 uses two ways, either alone or in combination, to avoid scanning the whole candidate pixels list.

The first one is to use a variable step when scanning the candidate pixel list, the value of the step depending on the size of the candidate list: the longer the list, the bigger the step. Another advantage of this method is a better control on the processing time (if there is a linear relation between the size of the candidate list and the step).

The second process consists in skipping a whole part of the list by choosing the first candidate pixel p such that $\delta(p)$ is smaller than $\delta(z)$, z being the pixel selected at the previous step. If such a pixel is found, then the scanning of the list is interrupted prematurely; otherwise, the whole list is scanned to find the candidate pixel with the minimum $\delta(p)$ value, and the threshold is tuned to that value.

As successive best candidates often belong to the same region, inserting the new candidates (neighbors of the selected pixel) at the beginning of the list can reduce the computation time. However, they are not considered at the first step after their insertion in order not to introduce a bias in favor of a particular region.

The following pseudocode is illustrative of the preferred method of seeding an image for use in FIG. 1.

Pseudo-code REGION GROWING
SEED_LIST List of seeds (pixel locations)
CANDIDATE_LIST List of pixels (locations) and their corresponding sets of motion parameters which are neighboring at least one region
REGION [ ] Array used to store the growing regions i.e. the lists of classified pixels (locations)
MOTION [ ] Array containing the motion parameters of the regions $A_1$
DELTA Function measuring the difference between motion of a pixel and a neighboring region [See Eqn. (4)]
MIN Variable used for storing the minimum DELTA
CHOSEN_PIX Chosen pixel
CHOSEN_REG Index of the chosen region
DYN_THRESHOLD Dynamic threshold to allow early selection of a candidate pixel
DYN_STEP Dynamic step for the scan loop of CANDIDATE_LIST
DYN_START Dynamic starting position for the scan loop
Initialize each REGION with the corresponding seed of SEED_LIST and initialize
CANDIDATE_LIST with the neighbors of each seed;
DYN_THRESHOLD=0;
DYN_START=0;
while CANDIDATE_LIST is not empty
    Set DYN_STEP depending the size of CANDIDATE_LIST, e.g. DYN_STEP=size of CANDIDATE_LIST/300
    for i=DYN_START to size of CANDIDATE_LIST, i=i+DYN_STEP
        CURRENT_PIX=pixel i in CANDIDATE_LIST
        if (DELTA(CURRENT_PIX)<MIN)
        MIN=DELTA(CURRENT_PIX)

CHOSEN_PIX=PROCES_PIX
CHOSEN_REG=index of the chosen region
   stop for if MIN<DYN_THRESHOLD
endfor
put each unclassified neighbor of CHOSEN_PIX in CANDIDATE_LIST and set
DYN_START as the number of new pixels in CANDIDATE_LIST;
Put CHOSEN_PIX in REGION[CHOSEN_REG];
Update MOTION[CHOSEN_REG];
Remove CHOSEN_PIX from CANDIDATE_LIST;
DYN_THRESHOLD=max (DYN_THRESHOLD, MIN)
endwhile Turning now to FIG. 4, there is shown a flow chart of the last mentioned pseudocode named REGION GROWING for growing the segmented regions. The region growing processing commences at step 402 after the completion of the seed selection process 108. In step 402, the seed list is stored in an array called REGION[ ]. This array REGION[ ] is used to store the growing regions, i.e. the lists of classified pixels. Initially, the seeds of the image are denoted as the initial regions for growing.

In the next step 404, the neighboring pixels of each seed are determined and stored in a list called CANDIDATE_LIST. In the next step 406, a variable DYN_THRESHOLD is set to zero. This variable stores a dynamic threshold to allow early selection of a candidate pixel in a manner, which will be explained below. After step 406 the processing continues at decision box 408, in which a check is made whether the CANDIDATE_LIST is empty. The CANDIDATE_LIST will be empty once there are no more pixels neighboring the growing regions. If the decision box 408 returns true then the processing continues at step 410 where the region growing process 110 is completed. If the decision block 408 returns false then the processing continues at step 412.

In step 412 the variable loop counter i is set to zero, the variable MIN is set to 256, and the variable DYN_STEP is set to the current size of the CANDIDATE_LIST divided by 300. The variable MIN is used for storing the minimum delta value of the previous iteration of the loop 408,412, . . . , and 436. The variable DYN STEP is used for storing a variable step value used for scanning the CANDIDATE-LIST. This variable step value is used for determining the delta values for a limited number of candidates in the CANDIDATE-LIST. Specifically, only those candidates spaced apart by a value equal to the step value will be considered for allocation to the region. After step 412, the processing continues at decision box 414, where a check is made whether the loop counter is less than the size of the CANDIDATE_LIST.

If the decision block 414 returns false, the processing continues at step 426, which s is described below. If, however, the decision box 414 returns true then the region growing process has not considered all the limited number of neighboring pixels. In this situation the processing continues at step 416, where the variable CURRENT_PIX is set to pixel i in the CANDIDATE_LIST. This step 416 sets the next candidate pixel to be considered, It should be noted that this pixel is spaced apart from the previous pixel considered by a distance equal to the value stored in the variable DYN_STEP. After step 416, the processing continues at the decision box 418.

In decision box 418, a comparison is made whether the difference between the motion vector of the current candidate pixel and the motion parameters of the neighboring region is less than MIN. If the decision box 418 returns false, then the processing continues at step 420. In step 420 the loop counter i is incremented by the step value stored in DYN_STEP. If the decision box 418, returns true, then the processing continues at step 422. In step 422, the MIN variable is now set to the minimum delta value determined for the current pixel. In addition, the variable CHOSEN_PIX is set to the selected current pixel and the variable CHOSEN_REG is set to the index of the current region. After step 422, the processing continues at step 424.

In decision block 424, a comparison is made whether the current minimum delta value stored in MIN is less than the current value stored in DYN_THRESHOLD. If the decision block 424 returns false then the processing continues at step 420, where the loop counter i is incremented by the step value stored in DYN_STEP. Otherwise, if the decision block 424 returns true then the processing continues at step 426. In step 426, each pixel neighboring the current pixel stored in CHOSEN_PIX, and not previously stored in the CANDIDATE_LIST, is now added to the CANDIDATE_LIST. After step 426, the processing continues at step 428, where the current pixel stored in CHOSEN_PIX is added to the region which is stored in REGION[CHOSEN_REG]. During step 428, the set of motion parameters for the region is updated and stored in MOTION[CHOSEN_REG]. As discussed previously, the set of motion parameters for the region are determined by formulating said affine model equations for each pixel of the region and then using regression methods such as M-estimators. At the next step 434, the current pixel stored in CHOSEN_PIX is removed from the candidates in CANDIDATE_LIST. The processing then continues at step 436, where the variable DYN_THRESHOLD is reset to the maximum value of the current values stored in MIN and DYN_THRESHOLD. After which, the processing returns to decision block 408. The process terminates when the CANDIDATE_LIST is empty.

Figure 4:
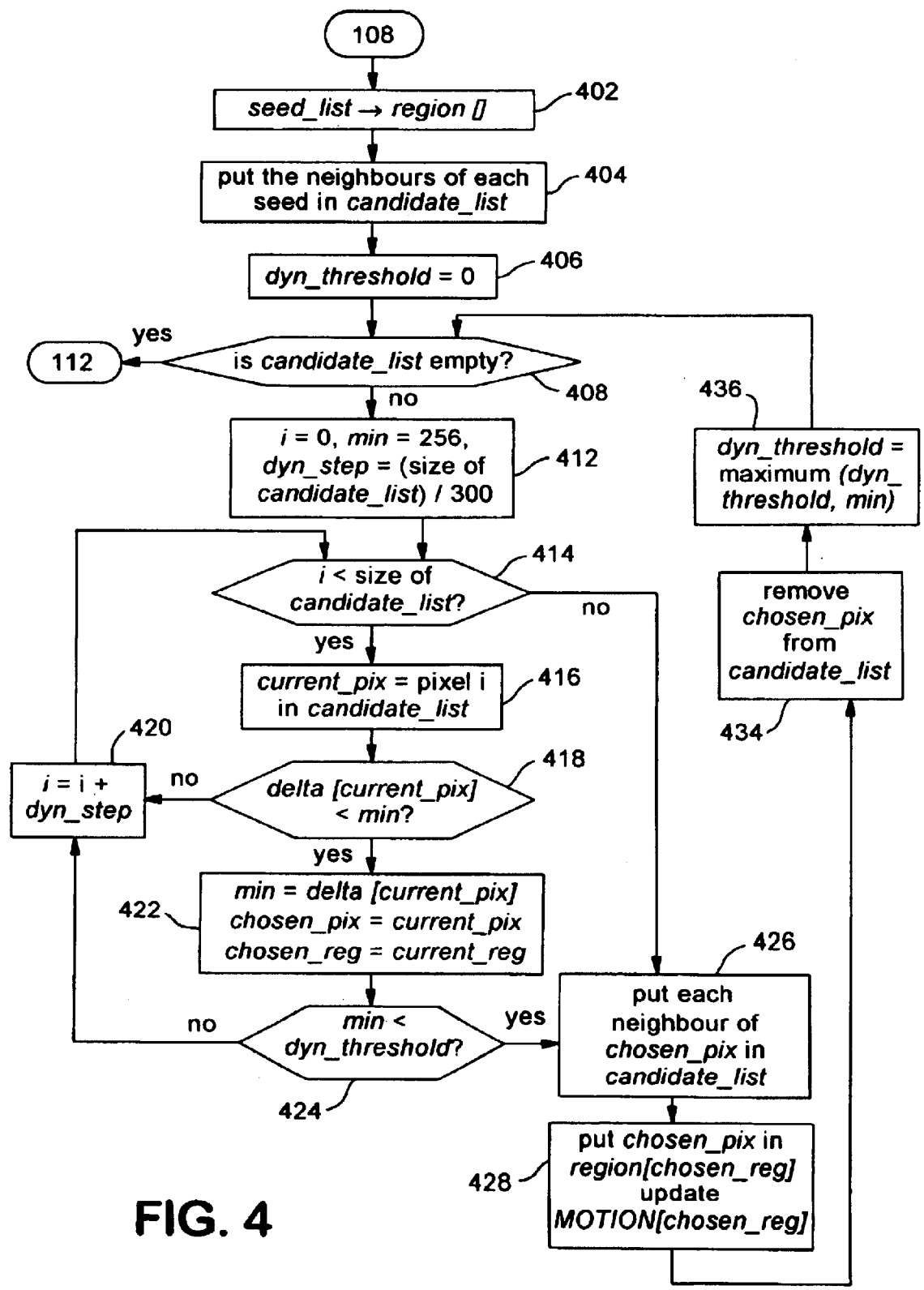
FIG. 4 is a flow chart of a method of region growing for use in the method of FIG. 1.

The preferred growing process of FIG. 4 continues until all pixels have been allocated to an associated region, resulting in a segmented frame and associated motion parameter field. The output of the seeded region growing is a set of homogeneous regions, wherein the number of regions obtained is equal to the number of seeds. The regions will continue to grow until they are bounded on all sides by other growing/grown to regions Also, some regions will grow more at the expense of others. For instance, there will tend to be large regions in the homogeneous areas and small regions in the non-homogeneous areas. Furthermore, the motion parameters for each region are re-evaluated while the region grows. In this way, the preferred method is able to segment videos into objects and describe the motion of each object with a set of motion parameters.

Figure 5:
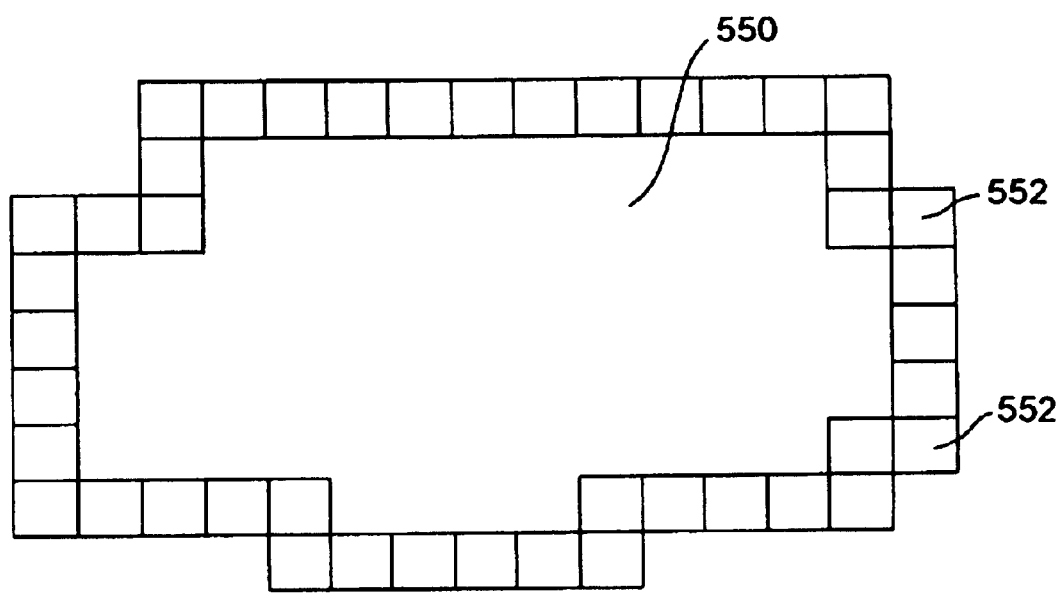
FIG. 5 illustrates an example of a region being grown in accordance with the region growing process of FIG. 4.

FIG. 5 illustrates a simplified example of the preferred region growing process. For simplicity's sake, this example shows only one region of the region growing process, whereas the preferred method allows the simultaneous growing of multiple regions. An initial region 550 consisting of a plurality of pixels (not shown) is surrounded by a number of candidate pixels 552 to be added to the region 550. Firstly, the process calculates the corresponding set of motion parameters of the pixels of the region 550. Then the process determines the difference between the set of motion parameters for the region and the motion vector of a limited number of candidate pixels 552 in turn, The process then determines the minimum difference of these differences and allocates the candidate pixel associated with this minimum difference to the region 550. If however, the motion difference value of any candidate pixel is less than the minimum difference value in the previous iteration, then the process instead allocates this candidate pixel to the region 550 and then proceeds to the next iteration. In the next iteration, the set of motion parameters of the pixels of the grown region 550 is then recalculated and the process continues.

1.3 Markov Random Field (MRF) Merging Process

During the merging step 112, the initial segmented image, that is the segmented motion parameter field, is represented as a region adjacency graph (RAG). The initial RAG is constructed from the initial segmentation result. Given an image that is segmented into a set of N disjoint regions such that R={$R_i$, 1≦i≦N}, the RAG is constructed by denoting each region $R_i$ as a node and connecting the regions which share a common boundary. Thus, a neighborhood system is defined on the graph, so that only spatially adjacent regions are neighbors. A clique is a subset of R such that it contains either a single node or several nodes that are all neighbors of each other, and where C is the set of all the cliques.

Figure 6:
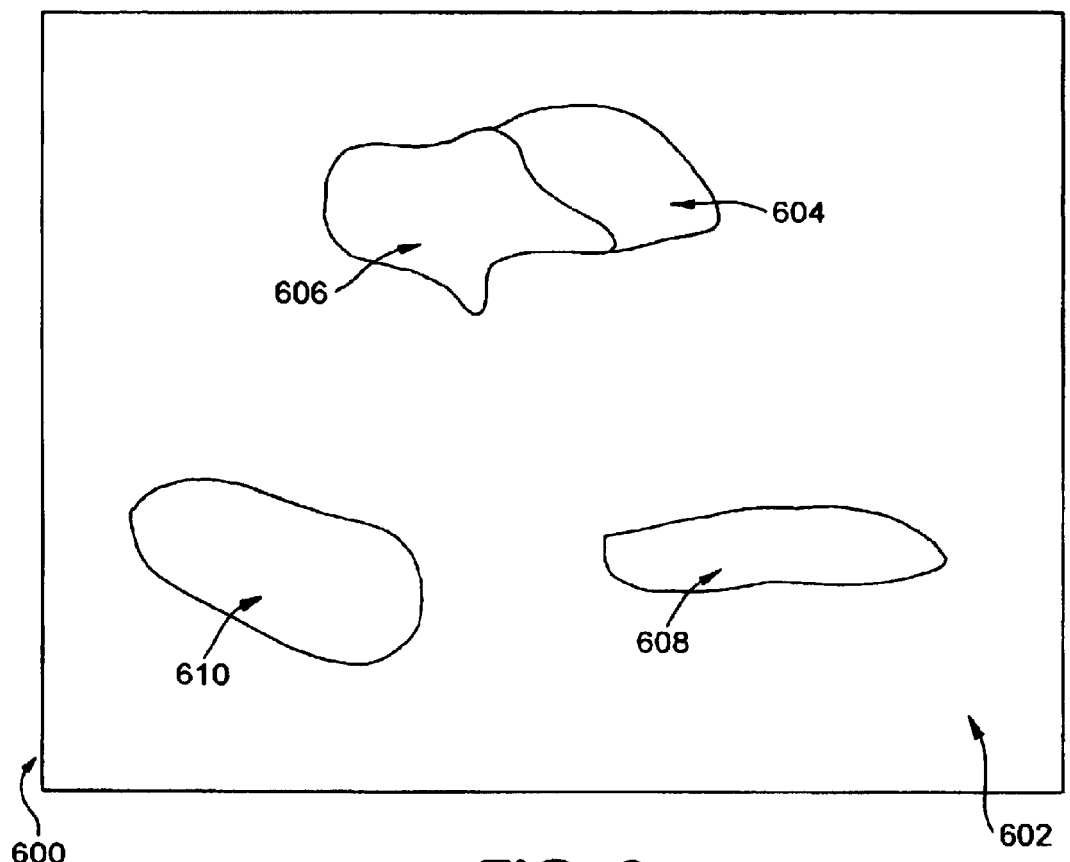
FIG. 6 is an example of a segmented motion parameter field.
Figure 7:
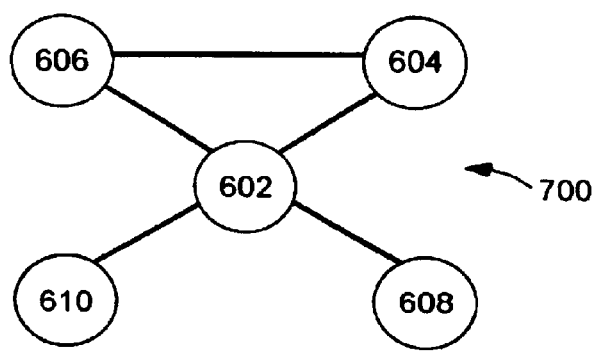
FIG. 7 is an example of a region adjacency graph corresponding to the motion parameter field of FIG. 6.

Turning now to, FIGS. 6 and 7 there is illustrated an example of a segmented motion parameter field 600 of a current frame of a video image and a corresponding region adjacency graph 700. The segmented parameter field consists of a number of moving objects 604,606,608 and 610 and a static object each having an associated set of motion parameters(not shown). The segmented regions 602,604, 606,608 and 610 of the field 600 are denoted as respective nodes 602,604,606,608 and 610 on the region adjacency graph 700. As can be seen, the couplings between the nodes on the graph 700 represent the common boundaries between the regions.

The preferred merging process 112 is preferably based on a Markov Random Field model. In the preferred Markov Random Field model, X={$X_i$, 1≦i≦N} denotes a set of random variables where $X_i$ is associated with region $R_i$ of the segmented image, and $\Lambda=\{\lambda_1, \lambda_2 \ldots ,\lambda_m\}$ is a set of possible labels such that $X_i \in \Lambda$ for all i.

For the MRF segmenter, the labels correspond to region names (m<N). In the initial segmentation obtained from the initial segmentation 110, the image is assumed to be over-segmented. The MRF segmenter iteratively updates the region names so that similar regions get the same name and are eventually merged.

In this model $\omega=(X_1=x_1, X_2=x_2, \ldots, X_N=x_N)$ is one of all instances from the configuration space. The vector X is a Markov random field if:
1. $P(\omega)>0$, for all $\omega$;
2. $P(X_i=x_i|X_j=x_j, R_j \neq R_i)=P(X_i=x_i|X_j=x_j, R_j \in G_i)$, where P(•) and P(•|•) are the joint and conditional probability density functions (pdf) respectively, and $G_i$ is the set of all the nodes in R which are neighbors of $R_i$. Intuitively, the MRF is a random field with the property that the statistic at a particular node depends only on that of its neighbors.

The pdf of the MRF has a general form, known as the Gibbs distribution:

$$P(\omega)=Z^{-1}\exp(-U(\omega)),\qquad \text{Eqn (6)}$$

where Z is a normalizing constant and U($\omega$) an energy function. The function U($\omega$) is obtained by summing some clique functions $V_c(\omega)$:

$$U(\omega) = \sum_{c \in C} V_c(\omega), \qquad \text{Eqn (7)}$$

$V_c(\omega)$ is a clique function which depends only on the variables $X_i$ such that the region $R_i$ belongs to clique c.

The MRF segmenter is preferably based on a region process, i.e. it merges regions based on their similarity. Since there should exist a discontinuity on the common boundary between two different segmented regions, the MRF segmenter could also use a boundary process.

The clique functions are defined based on the constraint that a segmented region should be uniform in its set of motion parameters, The clique functions may also be defined based on the constraint that a segmented region should be uniform in its motion parameters as well as other features such as intensity, colour, texture etc. A list of these other features are shown in Table B.

In this MRF model, $F_i^k$ denotes the normalized motion parameter set for region $R_i$ and M the number of features. Cliques which contain two regions are only considered and the clique functions are defined as:

$$V_c(\omega) = \sum_{\{R_i,R_j\} \in C} \eta_{ij} \max_{1 \leq k \leq M} |F_i^k - F_j^k|, \qquad \text{Eqn (8)}$$

where $\eta_{ij}$ is a binary variable which has the value 1 if $X_i$ and $X_j$ have the same region label, and the value 0 otherwise.

All the features are normalized using the mean and standard deviation computed for all the regions of the initial RAG, wherein the mean for each feature is zero and the STD is one. This allows the merging method to consider only the most discriminant feature for each region pair, as shown in equation (8).

TABLE B

Description of the other features measured for a region.
Cov = 3 × 3 covariance matrix; $lum_x$ = normalized luminance at pixel x; $N_x$ = set of 4 neighbors of pixel x.

| Feature | Definition |
|---|---|
| r | Mean R/(R + G + B) |
| g | Mean G/(R + G + B) |
| b | Mean D/(R + G + B) |
| C1 | Cov[0,0] |
| C2 | Cov[0,1] |
| C3 | Cov[0,2] |
| C4 | Cov[1,0] |
| C5 | Cov[1,1] |
| C6 | Cov[1,2] |
| MLum | Mean luminance |
| SDLum | Standard deviation of luminance |
| r-b | |
| r-g | |
| saturation | [max(r,g,b) − min(r,g,b)]/ max(r,g,b) |
| smoothness | $\frac{1}{area(R_i)} \sum_{x \in R_i} \sum_{y \in N_x} \frac{|lum_x - lum_y|}{4}$ |

The segmented image is merged by optimizing of the MRF model. MAP estimators aim at finding the configuration of the random field which maximizes the probability distribution eqn (6), i.e. minimizing the energy function eqn (7).

The minimization method used in the preferred merging process is a deterministic relaxation process. The binary clique which has the smallest $V_c(\omega)$, i.e. the smallest difference in features, is updated first: one of the regions takes the other region's name and both regions are merged. Then, the segmenter keeps updating the clique which has the smallest clique function until $V_c(\omega)$ is bigger than a predefined energy threshold $T_e$. Thus, regions having features which are different stay separated.

Once two regions are merged they can't be split again. After each merging, the energy needs to be updated only in the vicinity of the two regions which have just been merged.

Figure 8:
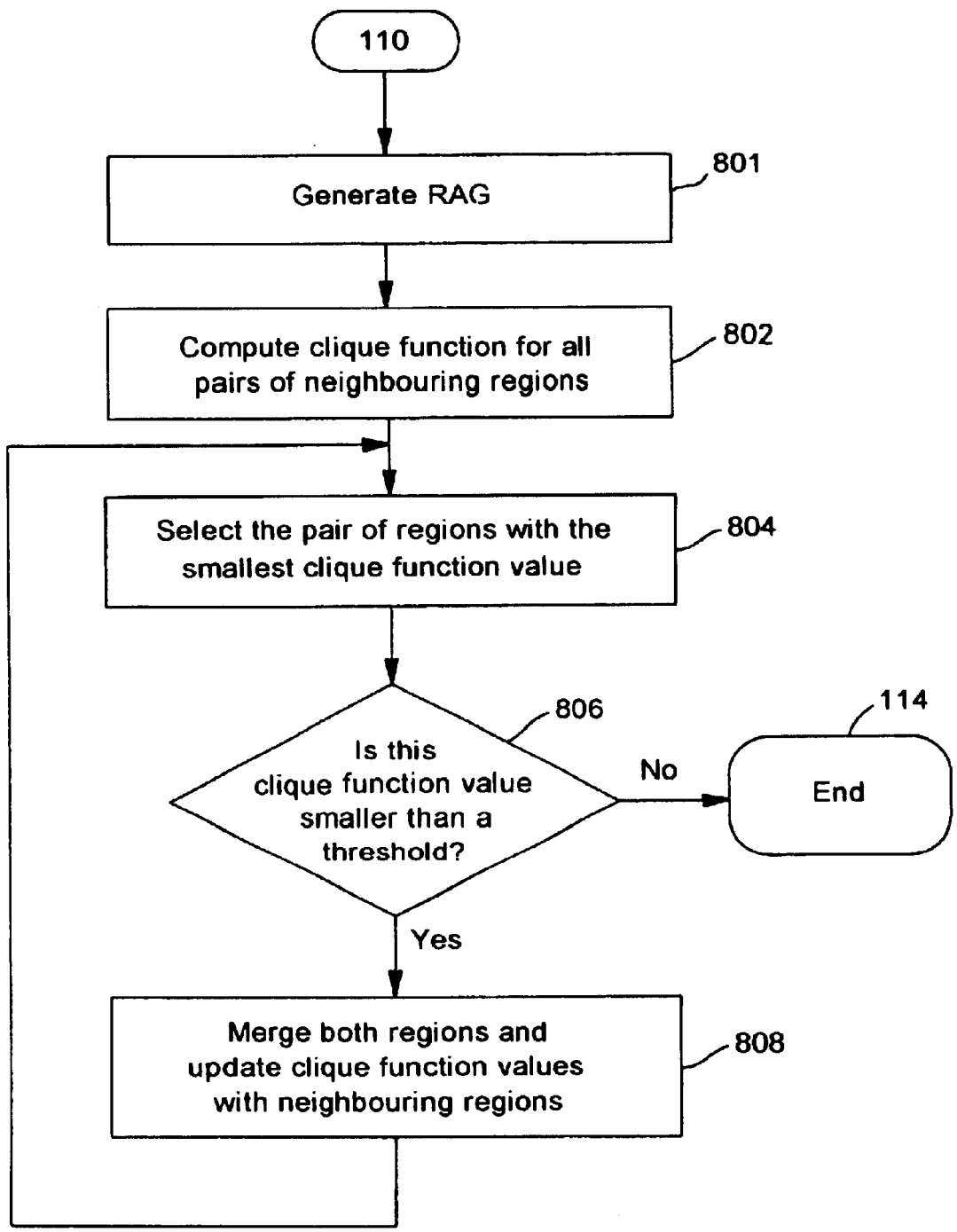
FIG. 8 is a flow chart of MRF merging process for use in the method of FIG. 1.

FIG. 8 is a flow chart of the preferred method of merging the regions of the segmented motion parameter field for use in the method of FIG. 1. The processing commences at step 801 after the completion of the region growing process 110. In step 801, a RAG is generated corresponding to the segmented motion parameter field produced by step 110. After the RAG of the segmented motion parameter field has been built by the step 801, the merging process commences. In the next step 802, clique functions $V_c(\omega)$ for all pairs of neighboring segmented regions. In the following step 804, the pair of segmented regions are selected which has the smallest clique function value. The processing continues at decision block 806, where a check is made whether this clique function value is less than a predetermined threshold value. If the decision block 806 returns true, then the processing continues at step 808. In step 808, both selected regions are merged and the features for merged regions are recomputed. In addition, the clique functions of the merged region with neighboring regions is updated. The merging process continues until the decision block 806 determines clique functions are greater than or equal to the predetermined threshold value. The merging process then terminates at step 114, where the final segmented image is outputted. The segmented image consists of segmented regions (objects) each having an associated set of motion parameters describing the motion of the region (object).

This merging process allows a good trade off between accuracy and speed.

Preferred Embodiment of Apparatus(s)

Figure 9:
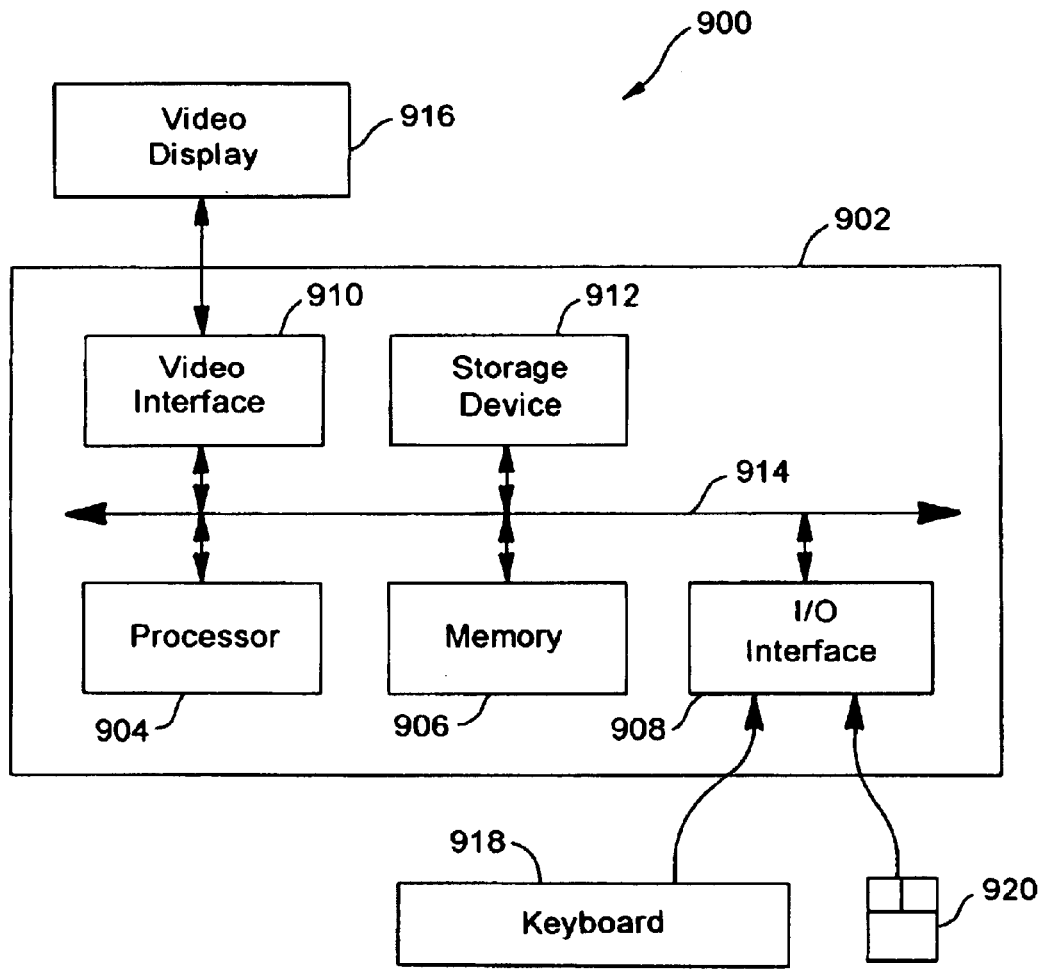
FIG. 9 is a block diagram of a general purpose computer.

The process of segmenting moving objects and determining their motion are preferably practiced using a conventional general-purpose computer, such as the one shown in FIG. 9, wherein the processes of FIGS. 1 to 9 may be implemented as software executing on the computer. In particular, the steps of the segmentation method are effected by instructions in the software that are carried out by the computer. The software may be divided into two separate parts; one part for carrying out the segmentation methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for segmentation of moving objects and determining their motion in accordance with the embodiments of the invention.

The computer system 900 consists of the computer 902, a video display 916, and input devices 918, 920. In addition, the computer system 900 can have any of a number of other output devices including line printers, laser printers, plotters, and other reproduction devices connected to the computer 902. The computer system 900 can be connected to one or more other computers via a communication interface 908c using an appropriate communication channel 930 such as a modem communications path, a computer network, or the like. The computer network may include a local area network (LAN), a wide area network (WAN), an Intranet, and/or the Internet The computer 902 itself consists of a central processing unit(s) (simply referred to as a processor hereinafter) 904, a memory 906 which may include random access memory (RAM) and read-only memory (ROM), input/output (IO) interfaces 908a, 908b & 908c, a video interface 910, and one or more storage devices generally represented by a block 912 in FIG. 9. The storage device(s) 912 can consist of one or more of the following: a floppy disc, a hard disc drive, a magneto-optical disc drive, CD-ROM, magnetic tape or any other of a number of non-volatile storage devices well known to those skilled in the art. Each of the components 904 to 912 is typically connected to one or more of the other devices via a bus 914 that in turn can consist of data, address, and control buses.

The video interface 910 is connected to the video display 916 and provides video signals from the computer 902 for display on the video display 916. User input to operate the computer 902 can be provided by one or more input devices 908b. For example, an operator can use the keyboard 918 and/or a pointing device such as the mouse 920 to provide input to the computer 902.

The system 900 is simply provided for illustrative purposes and other configurations can be employed without departing from the scope and spirit of the invention. Exemplary computers on which the embodiment can be practiced include IBM-PC/ATs or compatibles, one of the Macintosh™ family of PCs, Sun Sparcstation™, or the like. The foregoing are merely exemplary of the types of computers with which the embodiments of the invention may be practiced. Typically, the processes of the embodiments, described hereinafter, are resident as software or a program recorded on a hard disk drive (generally depicted as block 912 in FIG. 9) as the computer readable medium, and read and controlled using the processor 904. Intermediate storage of the program and pixel data and any data fetched from the network may be accomplished using the semiconductor memory 906, possibly in concert with the hard disk drive 912.

In some instances, the program may be supplied to the user encoded on a CD-ROM or a floppy disk (both generally depicted by block 912), or alternatively could be read by the user from the network via a modern device connected to the computer, for example. Still further, the software can also be loaded into the computer system 900 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The methods of segmenting moving objects and determining their motion may alternatively be implemented in dedicated hardware such as one or more integrated circuits performing the functions or sub functions of the image segmentation. Such dedicated hardware may include graphic processors, digital signal processors, or one or lo more microprocessors and associated memories. The foregoing only describes a small number of embodiments of the present invention, however, modifications and/or changes can be made thereto without departing from the scope and spirit of the invention. For example, where the motion of the moving objects are known to be substantially translational and involve substantially no rotational movement then step 106 may be dispensed with. In that case, the seeding step 108 and the region growing step 110 can then be based on the motion vector field rather than the motion parameter field. Similarly the motion of the regions (objects) are computed in terms of motion vectors rather than motion parameters. Thus the contrast criterion (see Eqn (2)) can be determined on the difference between the maximum motion vector and minimum motion vector. The criterion (Eqn (4)) can then be based on the difference between the motion vectors of the candidate pixel and region $A_i$. Still further, instead of using motion vectors and sets of motion parameters other parameters indicative of the motion can be used. The present embodiments are, therefore, to be considered in all respects to be illustrative and not restrictive.

We claim:

1. A method of segmenting moving objects and determining their motion from video image data, wherein said method comprises the steps of:

distributing seeds in areas of a current frame of video data as a function of motion of pixels of the current frame as compared to a previous frame, wherein fewer seeds are allocated to those areas of the current frame having homogeneous motion; and growing regions from the seeds so as to segment the current frame into a number of objects, wherein a number of pixels that border the growing regions are considered and that pixel of the number having a motion that is most similar to a motion of a region it borders is appended to that region and the motion of the region that includes the appended pixel is updated and said growing step is repeated until no pixels bordering the growing regions are available.

2. A method as claimed in claim 1, wherein said distribution step comprises the sub-steps of:

dividing the current frame into a plurality of areas;

allocating, for each divided area, one or more seeds as a function of a difference in the motion of the pixels within the area and the size of the divided area as compared to the size of the current frame; and storing the locations of each allocated seed.

3. A method as claimed in claim 1, wherein said growing step comprises the sub-steps of:

generating a list of pixels and corresponding motions that border the growing regions;

scanning a number of the listed pixels in a predetermined manner;

determining a value, for each scanned pixel, indicative of the similarity of the corresponding motion of the pixel and the corresponding motion of a growing region that the pixel borders;

selecting a pixel that has a minimum value;

appending the selected pixel to the region bordered by the selected pixel;

updating the motion of the region that includes the appended pixel; and repeating the sub-steps of said growing step until the current frame is segmented.

4. A method as claimed in claim 3, wherein said selection step selects the first scanned pixel of the list having a value below a minimum threshold.

5. A method as claimed in claim 3, wherein said selection step selects one of the pixels of the list having a value which is the minimum of all the pixels of the list.

6. A method as claimed in claim 1, wherein the method further comprises a step of merging the grown regions which have similarities.

7. A method of segmenting moving objects and determining their motion from video image data, wherein said method comprises the steps of:

comparing a current frame with a preceding frame of the video image data to compute a motion parameter field having a plurality of sets of motion parameters, wherein each pixel of the current frame has a corresponding set of motion parameters;

distributing seeds in areas of the motion parameter field as a function of the motion parameter sets within those areas, wherein fewer seeds are allocated to those areas of the motion parameter field having homogeneous motion parameter sets; and growing regions from the seeds so as to segment the current frame into a number of objects, wherein a number of pixels that border the growing regions are considered and that pixel of the number having a set of motion parameters that is most similar to a set of motion parameters of a region it borders is appended to that region and the set of motion parameters of the region that includes the appended pixel is updated and said growing step is repeated until no pixels bordering the growing regions are available.

8. A method as claimed in claim 7, wherein said comparing step comprises the sub-steps of:

comparing the current frame with a preceding frame of the video image data to compute a motion vector field having a plurality of motion vectors, wherein each pixel of the current frame has a corresponding motion vector; and sliding a window block over the motion vector field and generating a set of motion parameters for each pixel, wherein the motion parameters are based on a motion model of the motion vector field.

9. A method as claimed in claim 7, wherein said distribution step comprises the sub-steps of:

dividing the current frame into a plurality of areas;

allocating, for each divided area, one or more seeds as a function of a difference between the sets of motion parameters within the area and the size of the divided area as compared to the size of the current frame; and storing the locations of each allocated seed.

10. A method as claimed in claim 7, wherein said distribution step comprises the sub-steps of:

selecting the current frame or a previously divided area of the current frame as the current area;

seeding the center of the current area when a difference between sets of motion parameters within the current area is less than a first predetermined threshold;

subdividing the current area when the size of the current area is greater than a second predetermined threshold and the difference is greater than or equal to the first predetermined threshold;

uniformly seeding the current area in a low density manner when the size of the area is less than or equal to the second predetermined threshold and the difference is greater than or equal to the first predetermined threshold and less than a third predetermined threshold;

subdividing the current area when the size of the area is greater than a fourth predetermined threshold and less than or equal to the second predetermined threshold and the difference is greater than or equal to the third predetermined threshold;

uniformly seeding the current area in a high density manner when the size of the area is less than or equal to the fourth predetermined threshold and the difference is greater than or equal to the third predetermined threshold; and repeating the sub-steps of the said distribution step until all of the divided areas are seeded.

11. A method as claimed in claim 10, wherein said subdividing steps comprise subdividing the current area into four sub-areas.

12. A method as claimed in claim 10, wherein the difference is determined in accordance with the formula:

$$\text{difference} = \sum_{0}^{t=5} w_t (\min(\alpha_t) - \max(\alpha_t))^2$$

where $$w_t = \frac{1}{\sigma_t^2}$$

and $\sigma_t^2$ is the variance of the motion parameters $\alpha_t$ within the designated area.

13. A method as claimed in claim 7, wherein said distribution step comprises the sub-steps of:
  separating the motion parameter field of the current frame into a plurality of motion maps, wherein each motion map comprises motion parameters of the same type;
  performing the following sub-steps for each motion map:
    dividing the motion map into a plurality of areas; and
    allocating, for each divided area, one or more seeds as a function of a difference between the maximum motion parameter and minimum motion parameter of the motion map within the divided area and the size of the divided area as compared to the size of the motion map; and
    storing the locations of the allocated seeds of all motion maps in one list.

14. A method as claimed in claim 7, wherein said distribution step comprises a first sub-step of:
  separating the motion parameter field of the current frame into a plurality of motion maps, wherein each motion map comprises motion parameters of the same type; and
  said distribution step further comprises performing the following second sub-steps for each motion map:
    selecting the motion map or a previously divided area of the motion map as the current area;
    seeding the center of the current area when the difference between a maximum motion parameter and a minimum motion parameter within the current area is less than a first predetermined threshold;
    subdividing the current area when the size of the current area is greater than a second predetermined threshold and the difference is greater than or equal to the first predetermined threshold;
    uniformly seeding the current area in a low density manner when the size of the area is less than or equal to the second predetermined threshold and the difference is greater than or equal to the first predetermined threshold and less than a third predetermined threshold;
    subdividing the current area when the size of the area is greater than a fourth predetermined threshold and less than or equal to the second predetermined threshold and the difference is greater than or equal to the third predetermined threshold;
    uniformly seeding the current area in a high density manner when the size of the area is less than or equal to a the fourth predetermined threshold and the difference is greater than or equal to the third predetermined threshold; and
    repeating the sub-steps of the said distribution step until all of the divided areas are seeded.

15. A method as claimed in claim 14, wherein said subdividing steps comprise subdividing the current area into four sub-areas.

16. A method as claimed in claim 7, wherein said growing step comprises the sub-steps of:
  generating a list of pixels and corresponding set of motion parameters that border the growing regions;
  scanning a number of the listed pixels in a predetermined manner;
  determining a value, for each scanned pixel, indicative of the similarity of the corresponding set of motion parameters of the scanned pixel and the corresponding set of motion parameters of a growing region that the scanned pixel borders;
  selecting a pixel that has a corresponding minimum value;
  appending the selected pixel to the region bordered by the selected pixel;
  updating the set of motion parameters of the region that includes the appended pixel; and
  repeating the sub-steps of said growing step until the current frame is segmented.

17. A method as claimed in claim 16, wherein said selection step selects the first scanned pixel having a value below a minimum threshold.

18. A method as claimed in claim 16, wherein said selection step selects one of the pixels of the list having a value which is the minimum of all the pixels of the list.

19. A method as claimed in claim 7, wherein the method further comprises a step of merging the grown regions which have similarities.

20. A method as claimed in claim 19, wherein said merging step comprises the sub-steps of:
  determining for each pair of neighboring grown regions a clique function value representative of the similarity of motion of the pair of neighboring grown regions;
  selecting the pair of grown regions with the smallest clique function value;
  merging both sat selected regions to produce a merged region and updating the merged region's clique functions with neighboring regions, if the smallest clique function value is less than a predetermined threshold;
  repeating the sub-steps of said merging step until the smallest clique function value is greater than or equal to the threshold.

21. A method of segmenting moving objects and determining their motion from video image data, wherein said method comprises the steps of:
  (a) comparing a current frame with a preceding frame of the video image data to compute a motion vector field having a plurality of motion vectors, wherein each pixel of the current frame has a corresponding motion vector;
  (b) sliding window blocks over the motion vector field and generating a motion parameter field, wherein each pixel of the current frame has a corresponding set of motion parameters and the sets of motion parameters are based on a motion model of the motion vectors;
  (c) allocating pixels as seeds in areas of the current image as a function of the corresponding motion parameter sets within those areas, wherein fewer seeds are allocated to those areas of the current frame having homogeneous motion parameter sets and wherein the seeds form growing regions;

(d) generating a list of pixels and corresponding sets of motion parameters that border the growing regions;

(e) scanning a number of the pixels of the list;

(f) determining, for each scanned pixel, a value indicative of the similarity of the corresponding set of motion parameters of the scanned pixel and the corresponding set of motion parameters of a growing region that the scanned pixel borders;

(g) selecting a pixel that has a minimum value;

(h) appending the selected pixel to the growing region bordered by the selected pixel;

(i) updating the set of motion parameters of the region that includes the appended pixel;

(j) repeating said steps (d) to (i) until there are no more pixels that border the growing regions; and (k) merging neighboring grown regions to produce a merged region if their similarity is less than a predetermined threshold, wherein the merged regions represent the moving objects and their corresponding sets of motion parameters represent their motion.

22. An apparatus for segmenting moving objects and determining their motion from video image data, wherein said apparatus comprises:

means for distributing seeds in areas of a current frame of video data as a function of motion of pixels of the current frame as compared to a previous frame, wherein fewer seeds are allocated to those areas of the current frame having homogeneous motion; and means for growing regions from the seeds so as to segment the current frame into a number of objects, wherein a number of pixels that border the growing regions are considered and that pixel of the number having a motion that is most similar to a motion of a region it borders is appended to that region and the motion of the region that includes the appended pixel is updated and said means for growing regions is repeatedly applied until no pixels bordering the growing regions are available.

23. An apparatus for segmenting moving objects and determining their motion from video image data, wherein said apparatus comprises:

means for comparing a current frame with a preceding frame of the video image data to compute a motion parameter field having a plurality of sets of motion parameters, wherein each pixel of the current frame has a corresponding set of motion parameters;

means for distributing seeds in areas of the motion parameter field as a function of the motion parameter sets within those areas, wherein fewer seeds are allocated to those areas of the motion parameter field having homogeneous motion parameter sets; and means for growing regions from the seeds so as to segment the current frame into a number of objects, wherein a number of pixels that border the growing regions are considered and that pixel of the number having a set of motion parameters that is most similar to a set of motion parameters of a region it borders is appended to that region and the set of motion parameters of the region that includes the appended pixel is updated and said means for growing regions is repeatedly applied until no pixels bordering the growing regions are available.

24. An apparatus for segmenting moving objects and determining their motion from video image data, wherein said apparatus comprises:

means for comparing a current frame with a preceding frame of the video image data to compute a motion vector field having a plurality of motion vectors, wherein each pixel of the current frame has a corresponding motion vector;

means for sliding window blocks over the motion vector field and generating a motion parameter field, wherein each pixel of the current frame has a corresponding set of motion parameters and the sets of motion parameters are based on a motion model of the motion vectors;

means for allocating pixels as seeds in areas of the current frame as a function of the corresponding motion parameter sets within those areas, wherein fewer seeds are allocated to those areas of the current image having homogeneous motion parameter sets and wherein the seeds form growing regions;

means for generating a list of pixels and corresponding sets of motion parameters that border the growing regions;

means for scanning a number of the pixels of the list;

means for determining, for each scanned pixel, a value indicative of the similarity of the corresponding set of motion parameters of the scanned pixel and the corresponding set of motion parameters of a growing region that the scanned pixel borders;

means for selecting a pixel that has a minimum value;

means for appending selected pixel to the growing region bordered by the selected pixel;

means for updating the set of motion parameters of the region that includes the appended pixel;

means for repeating the operations of said generating means, scanning means, determining means, selecting means, appending means, and updating means until there are no more pixels that border the growing regions; and means for merging neighboring grown regions to produce a merged region if their similarity is less than a predetermined threshold, wherein the merged regions represent moving objects and their corresponding sets of motion parameters represent their motion.

25. A computer program product including a computer readable medium having recorded thereon a computer program for segmenting moving objects and determining their motion from video image data, wherein said computer program product comprises:

code for distributing seeds in areas of a current frame of video data as a function of motion of pixels of the current frame as compared to a previous frame, wherein fewer seeds are allocated to those areas of the current frame having homogeneous motion; and code for growing regions from the seeds so as to segment the current frame into a number of objects, wherein a number of pixels that border the growing regions are considered and that pixel of the number having a motion that is most similar to a motion of a region it borders is appended to that region and the motion of the region that includes the appended pixel is updated and said code for growing regions is repeatedly applied until no pixels bordering the growing regions are available.

26. A computer program product including a computer readable medium having recorded thereon a computer program for segmenting moving objects and determining their motion from video image data, wherein said computer program product comprises:

code for comparing a current frame with a preceding frame of the video image data to compute a motion parameter field having a plurality of sets of motion parameters, wherein each pixel of the current frame has a corresponding said set of motion parameters;

code for distributing seeds in areas of the motion parameter field as a function of the motion parameter sets within those areas, wherein fewer seeds are allocated to those areas of the motion parameter field having homogeneous motion parameter sets; and code for growing regions from the seeds so as to segment the current frame into a number of objects, wherein a number of pixels that border the growing regions are considered and that pixel of the number having a set of motion parameters that is most similar to a set of motion parameters of a region it borders is appended to that region and the set of motion parameters of the region that includes the appended pixel is updated and said code for growing regions is repeatedly applied until no pixels bordering the growing regions are available.

27. A computer program product including a computer readable medium having recorded thereon a computer program for segmenting moving objects and determining their motion from video image data, wherein said computer program product comprises:

code for comparing a current frame with a preceding frame of the video image data to compute a motion vector field having a plurality of motion vectors, wherein each pixel of the current frame has a corresponding motion vector;

code for sliding window blocks over the motion vector field and generating a motion parameter field, wherein each pixel of the current frame has a corresponding set of motion parameters and the sets of motion parameters are based on a motion model of the motion vectors;

code for allocating pixels as seeds in areas of the current frame as a function of the corresponding motion parameter sets within those areas, wherein fewer seeds are allocated to those areas of the current image having homogeneous motion parameter sets and wherein the seeds form growing regions;

code for generating a list of pixels and corresponding sets of motion parameters that border the growing regions;

code for scanning a number of the pixels of the list;

code for determining, for each scanned pixel, a value indicative of the similarity of the corresponding set of motion parameters of the scanned pixel and the corresponding set of motion parameters of a growing region that the scanned pixel borders;

code for selecting a pixel that has a minimum value;

code for appending the selected pixel to the growing region bordered by the selected pixel;

code for updating the set of motion parameters of the region that includes the appended pixel;

code for repeating the operations of said generating code, scanning code, determining code, selecting code, appending code, and updating code until there are no more pixels that border the growing regions; and code for merging neighboring grown regions to produce a merged region if their similarity is less than a predetermined threshold, wherein the merged regions represent the moving objects and their corresponding sets of motion parameters represent their motion.

\* \* \* \* \*

UNITED STATES PATENT AND TRADEMARK OFFICE
CERTIFICATE OF CORRECTION

PATENT NO. : 6,766,037 B1
DATED : July 20, 2004
INVENTOR(S) : Le et al.

It is certified that error appears in the above-identified patent and that said Letters Patent is hereby corrected as shown below:

Title page,
Item [56], References Cited, U.S. PATENT DOCUMENTS, "Szelisiki" should read -- Szeliski --.

Column 1,
Line 9, "data" should read -- data. --; and
Line 60, "said-" should read -- said --.

Column 3,
Line 32, "mean" should read -- means --; and
Line 34, "is" should be deleted.

Column 6,
Line 31, "an," should be deleted.

Column 7,
Line 35, "process," should read -- process. --; and
Lien 66, "$\sigma_1^2$" should read -- $\sigma_t^2$ --.

Column 10,
Line 62, "$_{a4,\, a5}$)" should read -- $a_4$, $a_5$) --.

Column 11,
Line 38, "$A_l$" should read -- $A_i$ --, and "a nd" should read -- and --.

Column 13,
Line 44, "DYN STEP" should read -- DYN_STEP --; and
Line 60, "considered," should read -- considered. --.

Column 15,
Line 42, "$X_l$" should read -- $X_1$ --.

Column 17,
Line 63, "Internet" should read -- Internet. --.

UNITED STATES PATENT AND TRADEMARK OFFICE
CERTIFICATE OF CORRECTION

PATENT NO.      : 6,766,037 B1
DATED           : July 20, 2004
INVENTOR(S)     : Le et al.

It is certified that error appears in the above-identified patent and that said Letters Patent is hereby corrected as shown below:

Column 21,
Line 65, "a" should be deleted.

Column 22,
Line 1, "the" should be deleted, and "the said" should be -- said --; and
Line 41, "sat" should be deleted.

Signed and Sealed this

Nineteenth Day of October, 2004

JON W. DUDAS
*Director of the United States Patent and Trademark Office*